(12) United States Patent
Michaelovich et al.

(10) Patent No.: US 9,320,009 B2
(45) Date of Patent: Apr. 19, 2016

(54) FINE TIMING MEASUREMENT BURST MANAGEMENT

(71) Applicant: Intel IP Corporation, Santa Clara, CA (US)

(72) Inventors: Shahar Michaelovich, Raanana (IL); Jonathan Segev, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/448,805

(22) Filed: Jul. 31, 2014

(65) Prior Publication Data
US 2015/0271776 A1 Sep. 24, 2015

Related U.S. Application Data

(60) Provisional application No. 61/968,630, filed on Mar. 21, 2014.

(51) Int. Cl.
*H04W 64/00* (2009.01)
*H04B 7/26* (2006.01)

(52) U.S. Cl.
CPC ............. *H04W 64/00* (2013.01); *H04B 7/2681* (2013.01)

(58) Field of Classification Search
CPC . H04W 64/00; H04W 74/04; H04W 74/0891; H04W 84/12
USPC ...................................... 455/456.1
See application file for complete search history.

(56) References Cited

U.S. PATENT DOCUMENTS

| 2010/0172259 | A1 | 7/2010 | Aggarwal et al. |
| 2012/0033554 | A1* | 2/2012 | Shiva et al. ................... 370/235 |
| 2012/0282948 | A1* | 11/2012 | Waters et al. ............... 455/456.2 |
| 2014/0073352 | A1* | 3/2014 | Aldana et al. .............. 455/456.1 |

FOREIGN PATENT DOCUMENTS

| TW | 200824460 A | 6/2008 |
| TW | 201219815 A | 5/2012 |

OTHER PUBLICATIONS

"Taiwan Application Serial No. 104104267, Office Action mailed Nov. 25, 2015", W/ English Search Report, 9 pgs.

* cited by examiner

*Primary Examiner* — Qutbuddin Ghulamali
(74) *Attorney, Agent, or Firm* — Schwegman Lundberg & Woessner, P.A.

(57) ABSTRACT

Fine Timing Measurement (FTM) Burst Management during Time-of-Flight (ToF) measurements in a wireless network separates FTM traffic from other traffic activity using two distinct Media Access Control (MAC) addresses and by coordinating access availability durations between FTM activity and other traffic. Communication stations save power by powering down receive paths between FTM frames. A communication station arranged for FTM Burst Management comprises physical layer circuitry and processors to use a first MAC address for FTM procedure signals, and a second MAC address that is distinct from the first MAC address for data and traffic signals other than FTM procedure signals, and exchange FTM procedure signals with the Access Point (AP) during scheduled FTM burst access availability periods using the first MAC address, and exchange other data and traffic signals with the AP during other access availability periods using the second MAC address.

23 Claims, 4 Drawing Sheets

FINE TIMING MEASUREMENT BURST MANAGEMENT

CLAIM OF PRIORITY UNDER 35 U.S.C. §119

The present Application for Patent claims the benefit of priority under 35 U.S.C. 119(e) to U.S. Provisional Patent Application Ser. No. 61/968,630, entitled "FINE TIMIMG MEASUREMENT BURST MANAGEMENT," filed Mar. 21, 2014, which is incorporated herein by reference in its entirety.

TECHNICAL FIELD

Embodiments pertain to wireless networks. Some embodiments relate to wireless networks that operate in accordance with one of the 802.xx family of standards developed by the Institute of Electrical and Electronic Engineers (IEEE) (hereinafter IEEE 802.11), including the IEEE 802.11-2012 standard. Some embodiments relate to Time-of-Flight (ToF) positioning. Some embodiments relate to managing data and signaling traffic during ToF Fine Timing Measurement (FTM) burst periods

BACKGROUND

Outdoor navigation and positioning has been widely deployed following the development of various Global Navigation Satellite Systems (GNSS) as well as various cellular systems. Indoor navigation and positioning differs from outdoor navigation and positioning because the indoor environment does not enable the reception of location signals from satellites or cellular base stations as accurately as does the outdoor environment. As a result, accurate and real-time indoor navigation and positioning are difficult to achieve. Solutions for indoor navigation and positioning may involve ToF positioning protocols.

During ToF positioning measurements, there is a need for preventing the Access Points (APs) from considering the STA as available for signal traffic other than FTM measurements during the FTM bursts in order to ensure accurate measurement.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device", and "user equipment" (UE) as used herein, refer to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "Access Point" (AP), as used herein, may be a fixed station. An access point may also be referred to as an access node, a base station or some other similar terminology known in the art. An access terminal may also be called a mobile station, a UE, a wireless communication device or some other similar terminology known in the art.

A Fine Timing Measurement (FTM) is a procedure for measuring the ToF, or Round Trip Delay, from a communication station (STA) to an Access Point (AP). The FTM procedure operates in allocations of time windows, called bursts, which are set by the AP and during which time windows, the AP may transmit one or more measurement frames called FTM measurement frames.

The communication station (STA) responds with an ACK frame enabling the AP and STA to calculate distance (or range) based on signal propagation. By measuring range to multiple APs, the STA can calculate its own location using trilateration techniques. Trilateration techniques involve the STA measuring its distance to multiple APs because good channel conditions suggest good channel data connectivity for reliable FTM measurements.

However, the AP may erroneously consider the STA as available for data and signaling traffic during its allocation of FTM time window burst periods because the FTM procedure constrains the STA while it is conducting its own signaling traffic between the AP and the STA. The STA receiver is substantially constrained during an FTM procedure because the STA signals its power save mode to the AP for transmitting and receiving FTM frames and because if the AP erroneously transmits traffic (signaling and data) interleaved with the FTM procedure, the STA Physical Layer Circuitry (PHY) must measure Time-Of-Arrival (ToA) (or a subset of the ToA functionality) over every frame addressed to it rather than over FTM frames only.

Figure 1:
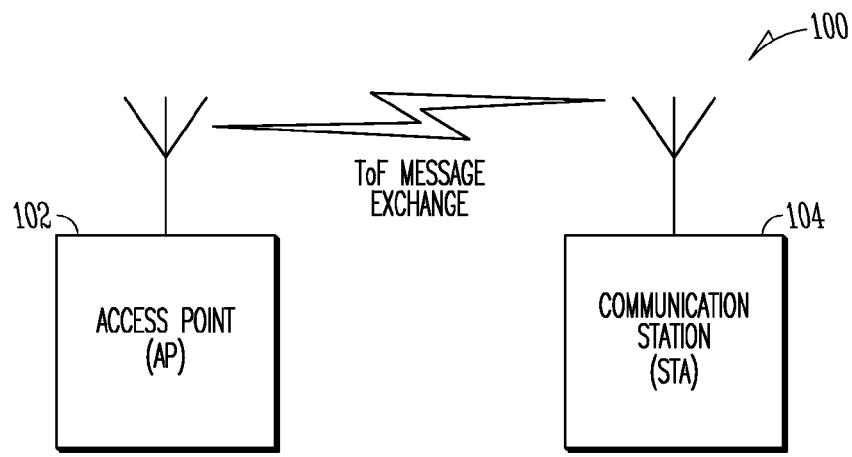
FIG. 1 is a network diagram illustrating an exemplary network environment suitable for FTM Burst Management, according to some example embodiments.

FIG. 1 is a network diagram illustrating an exemplary network environment suitable for FTM Burst Management, according to some example embodiments. A wireless network 100 includes a plurality of communication stations (STAs) 104 and one or more access points (APs) 102, which may communicate in accordance with IEEE 802.11 communication techniques. The communication stations (STAs) 104 may be mobile devices that are non-stationary and do not have fixed locations. The one or more APs 102 may or may not be stationary and have fixed locations. The stations may include an AP 102 and one or more responding communication stations (STAs) 104. The AP 102 may be a communication station that initiates ToF positioning with the communication station (STA) 104 to determine its location. The FTM Burst Management procedure may include the exchange of messages, as described in more detail below with reference to FIG. 2.

In some embodiments, the AP 102 may be a positioning station and may determine its location relative to one or more responding communication stations (STA) 104 (e.g., cooperating stations and/or one or more access points). The responding stations may be either IEEE 802.11 configured communication stations (STAs) 104 or APs 102. In other embodiments, the AP 102 may determine its location in geo-coordinates. In some embodiments, the responding communication station (STA) 104 may determine its location either in relative or in geo-coordinates.

Figure 2:
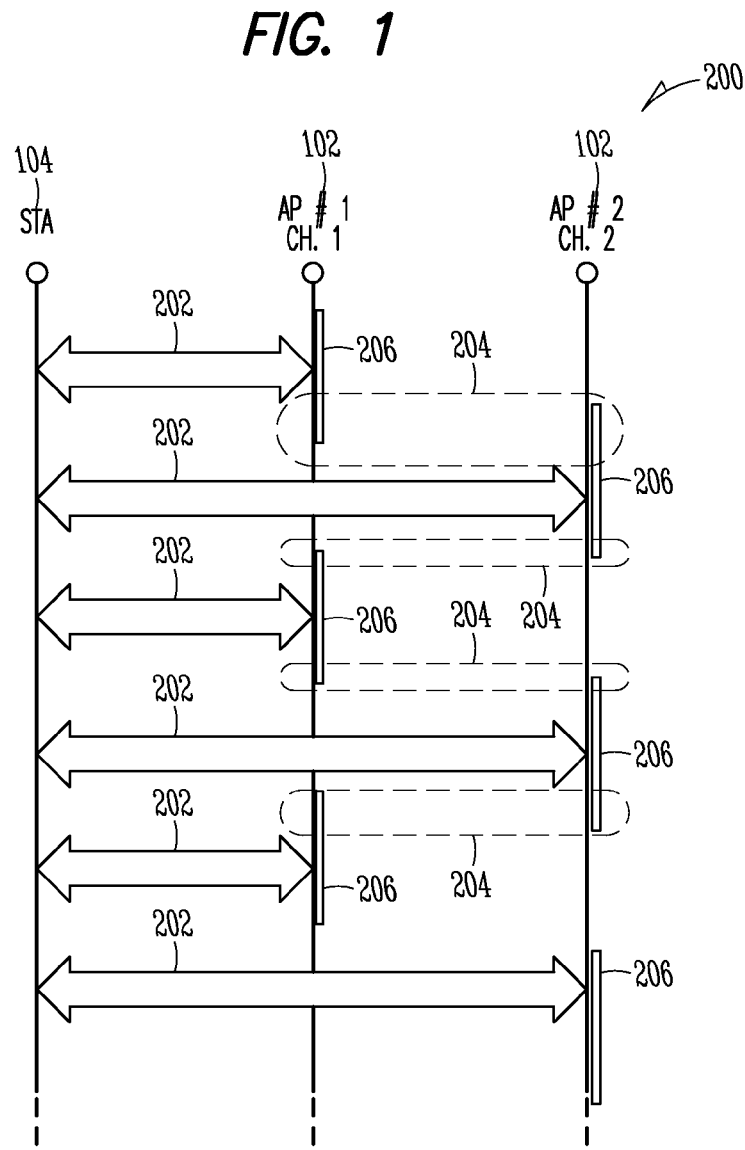
FIG. 2 shows a high level diagram illustrating FTM Burst Management operations with multiple Access Point trilateration, according to some exemplary embodiments.

FIG. 2 illustrates a procedure for ToF range FTM with multiple AP trilateration 200, according to some exemplary embodiments. The communication (STA) 104 registers with the AP 102 using a Media Access Control (MAC) address for FTM procedures that is distinct from the MAC address used for registering the communication station (STA) 104 with the AP 102 (and any other AP 102) for other traffic signals. These distinct MAC addresses prevent the AP 102 from considering the communication station (STA) 104 as available for traffic other than FTM signaling during FTM burst periods. FTM message frame exchanges 202 between the communication station 104 and the APs 102 occur during scheduled FTM burst periods 206. Conflicting duration of burst instances 204 may occur.

Figure 3:
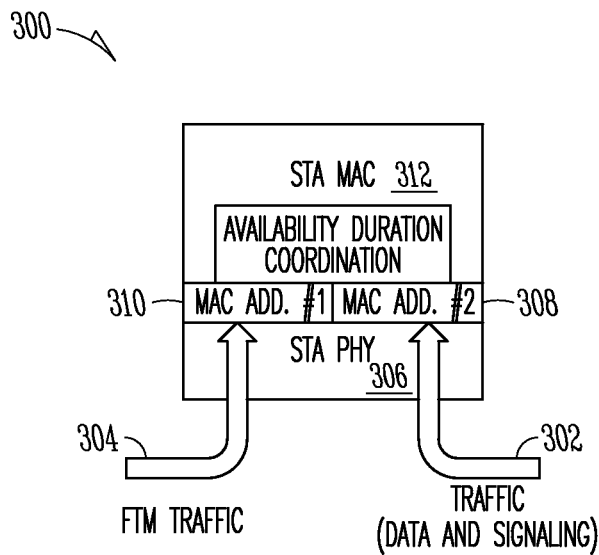
FIG. 3 illustrates Media Access Control support for FTM Burst Management operations, according to some example embodiments.

FIG. 3 illustrates MAC support for FTM Burst Management operations 300, according to some example embodiments having FTM traffic 304 activity separated from other data and signaling traffic 302 activity. Two distinct MAC addresses, 308 and 310, are assigned for coordinating available access durations between the FTM traffic signals 304 and other data and signaling traffic 302. Physical Layer 306 functionality separates FTM traffic 304 that is addressed to the first MAC address 310 from other data and signaling traffic 302 that is addressed to the second MAC address 310, such that the MAC Layer 312 can coordinate separate availability time periods for processing FTM traffic 304 and other data and signally traffic 302 separately in time.

By separating the FTM traffic 304 from other data and signaling traffic activity 302, the communication station's (STA) 104 receiver performs either FTM traffic 304 related activity (e.g. calculation, copying, channel estimation) or other data and signaling traffic 302 related activity at one time. This separation enables the communication station (STA) 104 receiver to be optimized for FTM procedures without the limitation of handling traffic other than the FTM traffic 304 for the ToA calculation portion of its ToF measurements.

This separation of FTM traffic 304 from other data and signaling traffic 302 is transparent to the AP 102, and does not require any AP 102 support to operate. Seamless operation is provided for association transitions (also called handovers) from one AP 102 to another AP 102 while FTMs are ongoing, without the limitation of requiring the AP 102 to coordinate new time windows between other data and signaling traffic 302 and FTM traffic 304. Communication stations STAs 104 save power, for example, by powering down receive paths and clock gating logic, and implementing other power saving techniques between consecutive FTM measurement frame exchanges 202.

Access availability duration coordination functionality within each communication station (STA) 104 may coordinate access between FTM traffic 304 availability durations and other data and signaling traffic 302 availability durations according to system constraints by negotiating separate access availability durations with the AP 102 as well as with other APs 102 with which the communication station (STA) 104 performs FTM measurements such that FTM traffic 304 and other data and signaling traffic 302 signals are coordinated and separated activities in time. Unscheduled Automatic Power Save Delivery U-APSD or IEEE 802.11 legacy sleep modes may be used by the communication station (STA) 104 to limit access durations available for other data and signaling traffic 302 such that an adequate time duration is available for FTM measurements by suspending access to other data and signaling traffic 302. A minimum time duration of access availability (i.e. a minimum delta FTM parameter) may be guaranteed between FTM procedure bursts 204 to allow access for other data and signaling traffic 302.

Figure 4:
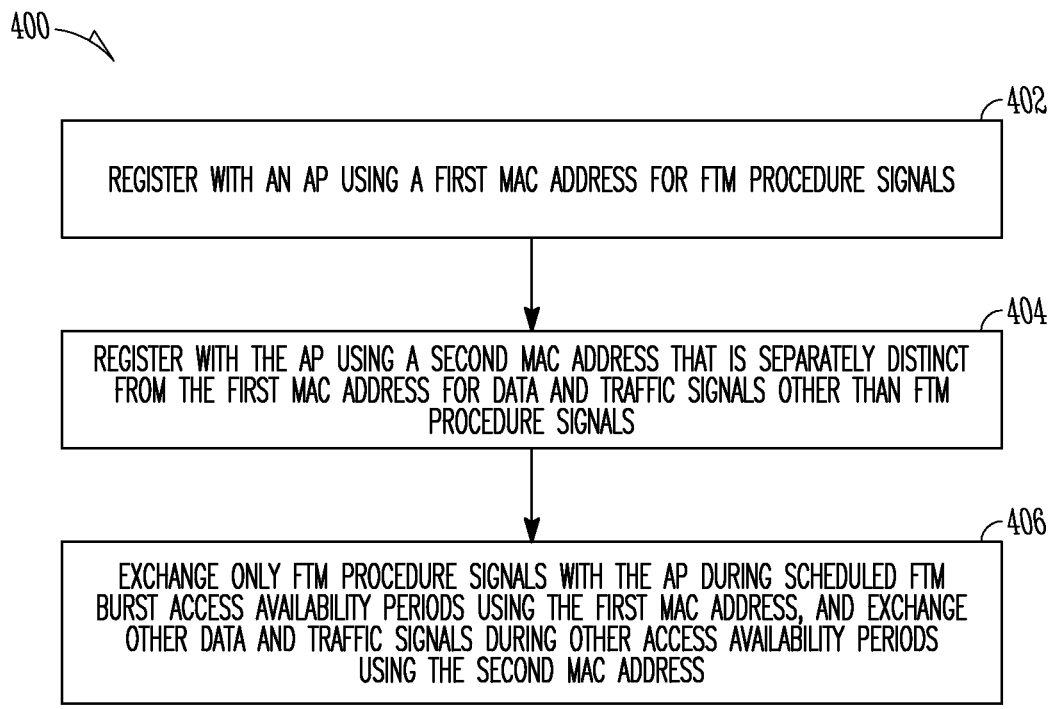
FIG. 4 is a high level overview flowchart of FTM Burst Management, according to some embodiments.

FIG. 4 is a high level overview flowchart of FTM Burst Management 400, according to some embodiments. A communication station 104 registers with an AP 102 using a first MAC address for FTM procedure signals in operation 402. The communication station 104 then registers with the AP 102 using a second MAC address that is distinct from the first MAC address for data and traffic signals other than FTM procedure signals in operation 404. After address registrations, the communication station 104 exchanges FTM procedure signals with the AP 102 during scheduled FTM burst access availability periods using the first MAC address, and exchanges other data and traffic signals during other access availability periods using the second MAC address in operation 406.

Figure 5:
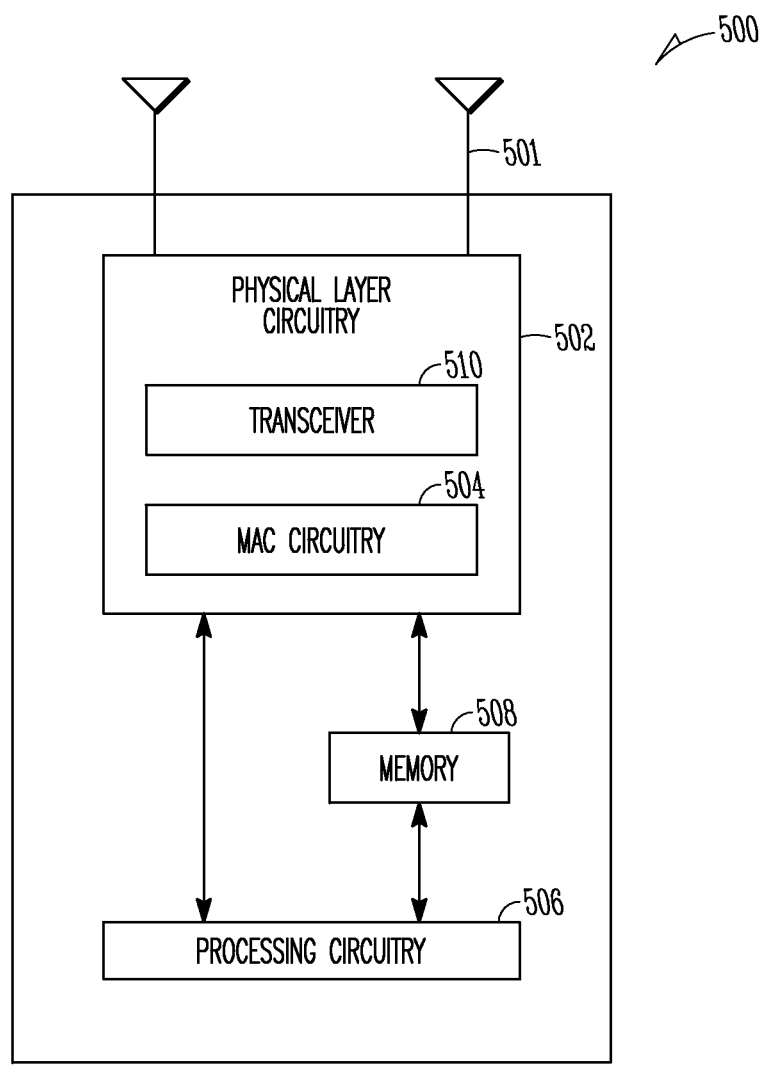
FIG. 5 shows a functional diagram of an exemplary communication station in accordance with some embodiments.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or communication station (STA) 104 (FIG. 1) in accordance with some embodiments. The communication station 500 may also be suitable for use as a handheld device, mobile device, cellular telephone, smartphone, tablet, netbook, wireless terminal, laptop computer, femtocell, HDR subscriber station, access point, access terminal, or other PCS device.

The communication station 500 may include physical layer circuitry 502 having a transceiver 510 for transmitting and receiving signals to and from other communication stations using one or more antennas 501. The physical layer circuitry 502 may also comprise media access control (MAC) circuitry 504 for controlling access to the wireless medium. The communication station 500 may also include processing circuitry 506 and memory 508 arranged to perform the operations described herein. In some embodiments, the physical layer circuitry 502 and the processing circuitry 506 may be configured to perform operations detailed in FIGS. 2 and 4.

In accordance with some embodiments, the MAC circuitry 504 may be arranged to contend for a wireless medium, and configure frames or packets for communicating over the wireless medium and the physical layer circuitry 502 may be arranged to transmit and receive signals. The physical layer circuitry 502 may include circuitry for modulation/demodulation, upconversion/downconversion, filtering, amplification, etc. In some embodiments, the processing circuitry 506 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein. The memory 508 may comprise any type of memory, including non-transitory memory, for storing information in a form readable by a machine (e.g., a computer). For example, the memory 508 may comprise a computer-readable storage device, read-only memory (ROM), random-access memory (RAM), magnetic disk storage media, optical storage media, flash-memory devices, and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas 501 may be effectively separated for spatial diversity and the different channel characteristics that may result between each of the antennas 501 and the antennas of a transmitting station.

In some embodiments, the communication station 500 may include one or more of a keyboard, a display, a non-volatile memory port, multiple antennas, a graphics processor, an application processor, speakers, and other mobile device elements. The display may be a Liquid Crystal Display (LCD) screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs). and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include Read-Only-Memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory 508.

Figure 6:
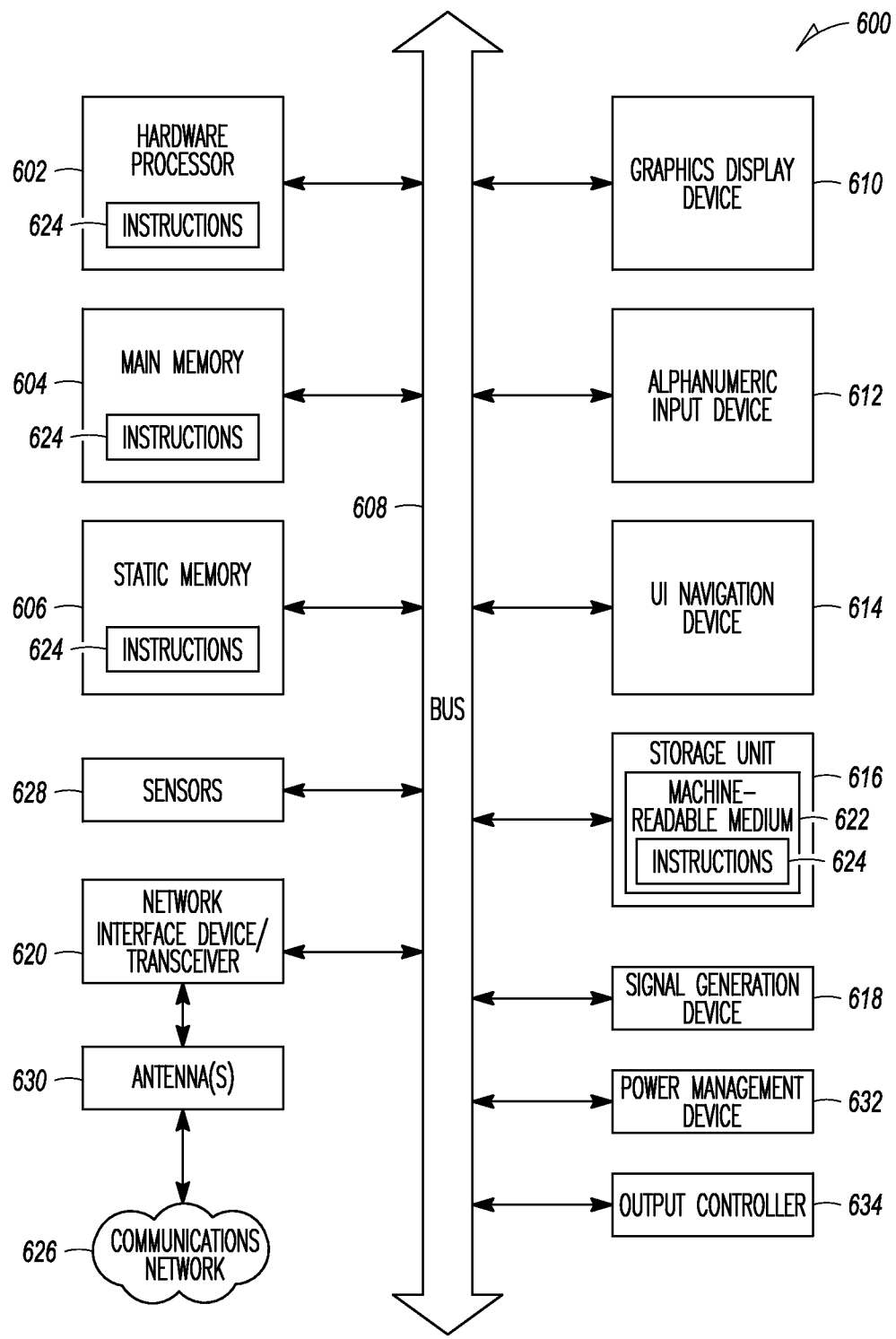
FIG. 6 shows a block diagram of an example of a machine upon which, any one or more of the techniques (e.g., methods) discussed herein may be performed.

FIG. 6 illustrates a block diagram of an example of a machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in a peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage unit (i.e., drive unit) 616, a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions 624. Non-limiting machine readable medium 622 examples may include solid-state memories, and optical and magnetic media. In an example, a massed machine readable medium comprises a machine readable medium 622 with a plurality of particles having resting mass. Specific examples of massed machine readable media may include: non-volatile memory, such as semiconductor memory devices (e.g., Electrically Programmable Read-Only-Memory (EPROM), or Electrically Erasable Programmable Read-Only-Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks 626 may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas 630 to connect to the communications network 626. In an example, the network interface device/transceiver 620 may include a plurality of antennas 630 to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 624 for execution by the machine 600, and includes digital or analog communications signals or other intangible media to facilitate communication of such software.

In one embodiment, a communication station is arranged for Fine Timing Measurement (FTM) Burst Management, the communication station comprising physical layer circuitry, memory, and processing elements to register with an Access Point (AP) using a first Media Access Control (MAC) address for FTM procedure signals, register with the AP using a second MAC address that is distinct from the first MAC address for data and traffic signals other than FTM procedure signals, and exchange FTM procedure signals with the AP during scheduled FTM burst access availability periods using the first MAC address, and exchange other data and traffic signals during other access availability periods using the second MAC address.

In another embodiment, a non-transitory computer readable storage device includes instructions stored thereon, which when executed by one or more processor(s) of a communication station, cause the communication station to perform operations to register with an Access Point (AP) using a first Media Access Control (MAC) address for FTM procedure signals, register with the AP using a second MAC address that is distinct from the first MAC address for data and traffic signals other than FTM procedure signals, and exchange FTM procedure signals with the AP during scheduled FTM burst access availability periods using the first MAC address, and exchange other data and traffic signals during other access availability periods using the second MAC address.

And in yet another embodiment, an Access Point (AP) arranged for Fine Timing Measurement (FTM) Burst Management comprises physical layer circuitry, memory, and processing elements to register a communication station by assigning a first Media Access Control (MAC) address for FTM procedure signals, further register the communication station by assigning a second MAC address that is distinct from the first MAC address for data and traffic signals other than FTM procedure signals, and exchange FTM procedure signals with the communication station during scheduled FTM burst access availability periods using the first MAC address, and exchange other data and traffic signals during other access availability periods using the second MAC address.

What is claimed is:

1. A communication station comprising a memory, and processing circuitry, wherein: the processing circuitry is arranged to:
   register with an Access Point (AP) using a first Media Access Control (MAC) address for Fine Timing Measurement (FTM) procedure signals;
   register with the AP using a second MAC address for data and traffic signals other than FTM procedure signals, wherein the first MAC address and the second MAC address are different; and
   exchange FTM procedure signals with the AP during scheduled FTM burst access periods using the first MAC address, and exchange signals other than FTM procedure signals during other access availability periods using the second MAC address.

2. The communication station of claim 1, wherein the processing circuitry is further arranged to coordinate access duration periods between the FTM burst access periods for the FTM procedure signals and the access availability periods for signals other than the FTM procedure signals.

3. The communication station of claim 1, wherein the processing circuitry is further arranged to coordinate and separate FTM procedure signals activities, and signal activities other than the FTM procedure signals activities, in time.

4. The communication station of claim 1, wherein the processing circuitry is further arranged to include one or more radios and one or more memories.

5. The communication station of claim 1, wherein the processing circuitry is further arranged to use a minimum time duration between consecutive FTM measurement frames.

6. The communication station of claim 1, wherein the processing circuitry is the further arranged to enter a sleep mode to suspend signals other than FTM procedure signals.

7. The communication station of claim 1, wherein the processing circuitry is further arranged to include one or more antennas.

8. The communication station of claim 1, wherein the processing circuitry is further arranged to optimize FTM procedures without a limitation of handling traffic other than the FTM traffic for Time-Of-Arrival calculation portions of Time of Flight Measurements.

9. A non-transitory computer readable storage device including instructions stored thereon, which when executed by one or more processor(s) of a communication station, cause the communication station to perform operations to:
register with an Access Point (AP) using a first Media Access Control (MAC) address for Fine Timing Measurement (FTM) procedure signals;
register with the AP using a second MAC address for signals other than FTM procedure signals, wherein the first MAC address and the second MAC address are different; and
exchange FTM procedure signals with the AP during scheduled FTM burst access availability periods using the first MAC address, and exchange signals other than FTM procedure signals during other access availability periods using the second MAC address.

10. The non-transitory computer readable storage device of claim 9, further including instructions thereon to coordinate access duration periods between the FTM burst access availability periods for the FTM procedure signals and the other access availability periods for the signals other than FTM procedure signals.

11. The non-transitory computer readable storage device of claim 9, further including instructions thereon to coordinate and separate FTM procedure signal activities, and signal activities other than FTM procedure signal activities, in time.

12. The non-transitory computer readable storage device of claim 9, further including instructions thereon to register with the AP using a second MAC address that is distinct from the first MAC address to prevent the AP from considering the communication station as available for traffic other than FTM procedure signaling traffic during the FTM burst access availability periods.

13. The non-transitory computer readable storage device of claim 9, further including instructions thereon to save power by powering down receive paths and clock gating logic, and implementing other power saving techniques between consecutive FTM measurement frames by using a minimum time guaranteed between consecutive FTM measurement frames.

14. The non-transitory computer readable storage device of claim 9, further including instructions thereon to use sleep modes for limiting access durations for the signals other than FTM procedure signals such that an adequate time duration is available for FTM measurements by suspending access to the signals other than FTM procedure signals.

15. The non-transitory computer readable storage device of claim 9, further including instructions thereon to guarantee a minimum time duration of access availability between FTM procedure bursts to allow access for the signals other than FTM procedure signals.

16. The non-transitory computer readable storage device of claim 9, further including instructions thereon to perform either FTM traffic related activity or activity other than FTM procedure traffic related activity at one time.

17. The non-transitory computer readable storage device of claim 9, further including instructions thereon to optimize FTM procedures without a limitation of handling traffic other than the FTM traffic for Time-Of-Arrival calculation portions of Time of Flight Measurements.

18. An Access Point (AP) comprising a memory, and processing circuitry, wherein: the processing circuitry is arranged to:
register a communication station according to a first Media Access Control (MAC) address for Fine Timing Measurement (FTM) procedure signals;
register the communication station according to a second MAC address for signals other than FTM procedure signals, wherein the first MAC address and the second MAC address are different; and
exchange FTM procedure signals with the communication station during scheduled FTM burst access availability periods using the first MAC address, and exchange signals other than FTM procedure signals during other access availability periods using the second MAC address.

19. The AP of claim 18, wherein the processing circuitry is further arranged to negotiate separate access availability durations with the communications station such that the FTM procedure signals and the signals other than FTM procedure signals are coordinated and separated activities in time.

20. The AP of claim 18, wherein the processing circuitry is further arranged to include one or more radios and one or more memories.

21. The AP of claim 18, wherein the processing circuitry is further arranged to include one or more antennas.

22. A method for Fine Timing Measurement (FTM) Burst Management performed by a wireless apparatus, the method comprising:
register with an Access Point (AP) using a first Media Access Control (MAC) address for FTM procedure signals;
register with the AP using a second MAC address that is distinct from the first MAC address for signals other than FTM procedure signals; and
exchange FTM procedure signals with the AP during scheduled FTM burst access availability periods using the first MAC address, and exchange signals other than FTM procedure signals during other access availability periods using the second MAC address.

23. The method of claim 22, further comprising coordinating access duration periods between the FTM burst access availability periods for FTM procedure signals and the other access availability periods for signals other than FTM procedure signals.

* * * * *